June 13, 1944.  M. BENITO Y DE LA ROSA ET AL  2,350,980
RESILIENT WHEEL FOR VEHICLES
Filed Jan. 29, 1943
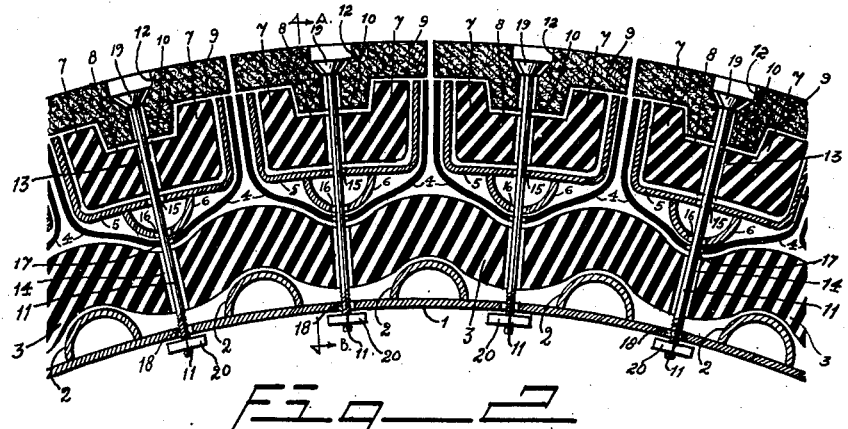
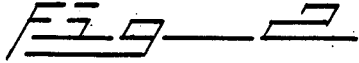
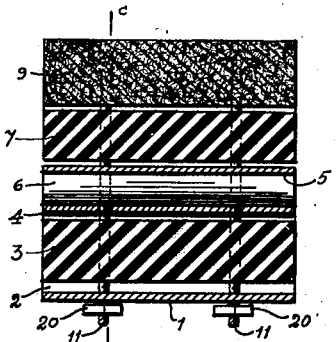
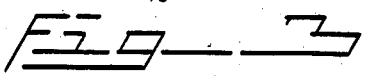
INVENTORS
Manuel Benito y de la Rosa and
Delina Clavijo y Garcia
BY Singer, Chlert, Stern & Carlberg
ATTORNEYS Patented June 13, 1944

2,350,980

UNITED STATES PATENT OFFICE 2,350,980

RESILIENT WHEEL FOR VEHICLES

Manuel Benito y de la Rosa and Delina Clavijo y Garcia, Habana, Cuba

Application January 29, 1943, Serial No. 473,906
In Cuba January 30, 1942

3 Claims. (Cl. 152—7)

This invention relates to certain new and useful improvements in resilient wheels for vehicles, particularly for heavy vehicles, such as busses, trucks and the like.

The main object of this invention is to provide a wheel composed of a plain inner rim on which and spaced apart therefrom by spaced transversal metallic half-round projections rigidly secured to the rim are disposed a circular rubber band, a circumferential series of cushion blocks each of which is lodged in a transversal metallic channel-shape shell disposed on the circular rubber band and each spaced therefrom by a transversal metallic half-round projection outwardly secured to the shell bottom, a circumferential series of fiber blocks disposed on the cushion blocks and forming the wheel tread surface, and radial tying metallic members tightening the fiber blocks on the rim and which pass through holes in the cushion blocks and the rubber band and through holes in the shells enclosing the cushion blocks. By means of this arrangement the metallic shells carrying the cushion blocks and the fiber blocks are allowed to move radially in relation to the circumferential rubber band which is caused to adopt an undulated shape by the pressure exerted by the shells due to the tightening action of the tying members, the wheel thus affording its greater coefficient of safety and permitting strikes against any of the fiber blocks to be absorbed and deadened by a portion of the circumferential rubber band, whereby the strike effect will not be transmitted to the remainder of the wheel periphery, and at the same time the punches and bursts are eliminated.

The invention is described with reference to the figures of the accompanying drawing, of which:

Figure 1 is a fragmentary longitudinal sectional view of the wheel on line C—D of Fig. 2.

Figure 2 is a radial vertical sectional view of the wheel on line A—B of Fig. 1.

Figure 3 is a fragmentary longitudinal vertical section of the circumferential rubber band forming a portion of the wheel tire.

In the drawing in which the same reference numbers indicate similar parts in all figures, 1 illustrates a plain metallic rim which forms the inner member of the wheel and which is provided with a series of half-round convex projections 2 spaced apart from one another and firmly secured in transversal position on the outer face of the rim 1.

On the half-round projections 2 is disposed a circumferential rubber band 3 on which and through intermediate leather shells 4 of channeled cross-section are positioned transversal channel-shaped metallic shells 5 having radial sides and each of which is provided with a half-round convex projection 6 firmly secured beneath the bottom portion of each metallic shell 5 and on the middle line of same. In this manner the metallic shells 5 are separated from one another by the leather shells 4 the sides of which will form the joints between adjacent shells 5.

In each of the metallic shells 5 is lodged a cushion block 7 made of rubber whose outer cross-section shape is exactly as the inner cross-section shape of the shell 5, each cushion block 7 having a recess 8 all along the longitudinal length of its upper face, said recess 8 having its sides slightly inclined divergently to afford a larger opening to the outside.

On each cushion block 7 is disposed a fiber block 9 covering the side edges of each metallic shell 5 and of each leather shell 4 to form the joint with each adjacent fiber block 9, each fiber block 9 carrying a projection 10 all along the longitudinal length of its lower face by means of which it engages the recess 8 of the respective cushion block 7, any side sliding of each fiber block 9 with respect to its respective supporting cushion block 7 being thus prevented.

Each fiber block 9 with its respective cushion block 7 is tied somewhat loosely to the inner rim 1 by means of a radially disposed head pin 11 passing across holes 12, 13 and 14 formed respectively in the fiber block 9, the cushion block 7 and the rubber band 3, and across holes 15, 16, 17 and 18 formed respectively in the bottom of each shell 5, in the cut projecting portion of each half-round projection 6, in the base of each leather shell 14, and in the rim 1, the head 19 of pin 11 remaining concealed within the countersink hole 12 of fiber block 9, and the opposed end of head pin 11 projecting beneath the rim 1 being threaded to tightly receive against the inner face of rim 1 a nut 20.

Due to the tightening of the head pins 11 by means of their respective nuts 20 and by disposing the half-round projections 6 projecting from the shells 5 downwards, alternately to the half-round projections 2 projecting upwards from the rim 1, the circumferential rubber band 3 affects the undulated shape shown in Fig. 1.

In the operation of the wheel, any violent strike against a fiber block 9 of the wheel tire, as caused by a deep hole in the road or a collision against a sidewalk, will be transmitted to the cushion block 7 beneath the fiber block 9, and the cushion block 7 will transmit it by the intermedium of the channeled shell 5 and half-round projection 6 secured thereto and the base of respective leather shell 14 to a limited portion of the circumferential band 3 comprised between two successive half-round projections 2 secured to the rim 1, and each channeled shell 5 carrying its respective block 7 will be permitted to move radially and transversally with relation to each adjacent channeled shell 5 by sliding downwards together with its respective head pin 11.

What we claim is:

1. A wheel comprising a plain metallic rim having at intervals thereof upward projections, a series of metallic channeled shells disposed transversally one adjacent the other and each shell being provided with a downward projection, a circumferential rubber band disposed between the upper projections of the rim and the lower projections of the metallic shells, a series of cushion blocks respectively lodged in the metallic channeled shells, a series of fiber blocks disposed respectively on the cushion blocks and forming the tread surface of the wheel tire, and tying members tightening each fiber block on the rim through each cushion block and its shell and through the circumferential rubber band.

2. A wheel comprising a plain metallic rim having upward convex projections at intervals thereof, a series of metallic channeled shells disposed transversally one adjacent the other and each shell being provided with a downward convex projection from the middle line of its bottom, the downward projections of the shells being disposed alternately to the upward projections of the rim, a circumferential rubber band between the upper projections of the rim and the lower projections of the shells, leather shells surrounding the sides and below the metallic shells to bear on the circumferential rubber band, a series of cushion blocks respectively lodged in the metallic channeled shells, a series of fiber blocks respectively disposed on the cushion blocks to form the tread surface of the wheel tire, and tying members tightening each fiber block on the rim through every cushion block and its shell, every leather shell and the circumferential rubber band.

3. A wheel comprising a plain metallic rim having upward half-round convex projections at intervals thereof, a series of metallic channeled shells with radial sides disposed transversally one adjacent the other and each shell being provided with a downward half-round convex projection from the middle line of its bottom, the downward projections of the shells being arranged alternately to the upward projections of the rim, a circumferential rubber band disposed between the upper projections of the rim and the lower alternate projections of the shells, leather shells surrounding the metallic shells by their sides and beneath the respective lower projection of each shell to bear on the circumferential rubber band, a series of cushion blocks respectively lodged in the metallic channeled shells and having a longitudinal recess at their upper face, a series of fiber blocks respectively disposed on the cushion blocks to form the tread surface of the wheel tire and to cover the side edges of the channeled shells and the leather shells, each fiber block being provided with a longitudinal projection at its lower face to engage the upper recess formed in each cushion block, countersink head bolts in each fiber block and radially disposed across holes in each fiber block, in each cushion block and in the circumferential rubber band and across holes in the bottom of each channeled shell and of its respective half-round projection and in the base of each leather shell and in the rim, and nuts screwed on the lower projecting ends of said head bolts and tightening on the inner face of the rim.

MANUEL BENITO Y DE LA ROSA.
DELINA CLAVIJO Y GARCIA.